Jan. 30, 1951
C. N. SMYTH
FOCUSING AND DEFLECTING MEANS FOR CATHODE-RAY TUBES
Filed Sept. 26, 1947
2,539,492
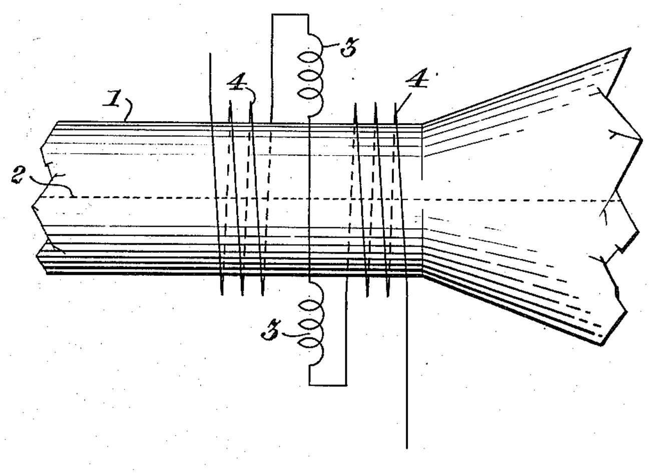
INVENTOR.
CHARLES NORMAN SMYTH
BY Robert Harding Jr.
ATTORNEY Patented Jan. 30, 1951 2,539,492

UNITED STATES PATENT OFFICE 2,539,492

FOCUSING AND DEFLECTING MEANS FOR CATHODE-RAY TUBES

Charles Norman Smyth, London, England, assignor to International Standard Electric Corporation, New York, N. Y., a corporation of Delaware Application September 26, 1947, Serial No. 776,271
In Great Britain June 6, 1939

Section 1, Public Law 690, August 8, 1946
Patent expires June 6, 1959

2 Claims. (Cl. 250—156)

This invention relates to electromagnetic deflection systems for cathode ray tubes.

Due to practical considerations, deflection coils used with magnetically deflected cathode ray tubes produce in general fields which are not ideally normal to the cathode ray beam at all scanning angles and a small component of the deflecting field affects the focus of the beam, instead of the deflection, and results in a non-uniformly focussed raster.

In addition, in cathode ray tubes in which the fluorescent screen is not part of a spherical surface centered at the deflecting point certain parts of the raster will be more accurately focussed than others. This effect may add to or subtract from the focus errors caused as described in the first paragraph.

In order to produce uniform focus over the area of the raster, it is proposed to add focus bucking turns to the deflector coils to neutralise the unwanted component of the fields described in the first paragraph, or to compensate at least partially for the errors in focus introduced by a combination of the two effects described. In practice the neutralisation may be complete only at certain angles of deflection and approximate at other angles.

Such focus-bucking turns may comprise circular turns of wire lying in a plane perpendicular to the tube axis and connected in series with the deflector coils.

A better understanding of the invention and of its objects and features may be obtained by reading the following description in conjunction with the accompanying drawing showing a fragmentary view of a cathode ray tube employing focus correction.

In this arrangement 1 designates the cathode ray tube envelope while the dotted center line 2 indicates the path of the cathode ray beam. Electromagnetic deflecting coils 3 have auxiliary focus correcting coils 4—4 connected one to each end of the deflecting coils 3. Each coil 4 consists of a relatively few turns of wire arranged in a plane perpendicular to the axis of the tube.

In a particular example for use with a television receiving tube about ten turns constitute the coils 4—4 which are located at each end of the line deflection coils 3—3 and are connected in series with the line deflector coils. Similar correction may be made in connection with the frame deflector coils.

Generally speaking, the total number of focus-bucking turns will not exceed 10% of the total number of turns on the deflector coils.

Other ways of feeding a focus connecting coil with deflector coil currents to set up the necessary small corrective field will be readily appreciated. In its broadest aspect the invention consists in connecting a focus correcting coil to be fed with a current of wave form similar to the deflecting current.

What is claimed is:

1. A cathode ray tube comprising a screen, a pair of serially connected electromagnetic deflection coils spaced from said screen and having a given number of turns lying in planes substantially parallel to the tube axis, and at least one focus-bucking coil positioned immediately adjacent said deflection coils on the side facing said screen and having relatively few turns lying in planes substantially perpendicular to the tube axis, said focus-bucking coil being connected in series with the deflection coils.

2. A cathode ray tube according to claim 1, wherein there is provided a second focus-bucking coil positioned immediately adjacent the deflection coils on the side thereof remote from the screen, said second focus-bucking coil being connected in series with said deflection coils.

CHARLES NORMAN SMYTH.

REFERENCES CITED

The following references are of record in the file of this patent:

UNITED STATES PATENTS

| Number | Name | Date |
|---|---|---|
| 2,178,093 | Zworykin | Oct. 31, 1939 |
| 2,219,194 | Mynall | Oct. 22, 1940 |
| 2,220,303 | Tingley | Nov. 5, 1940 |
| 2,451,641 | Torsch | Oct. 19, 1948 |
| 2,472,165 | Mankin | June 7, 1949 |